(12) United States Patent
Kim et al.

(10) Patent No.: US 9,023,517 B2
(45) Date of Patent: May 5, 2015

(54) SECONDARY BATTERY

(75) Inventors: Yongsam Kim, Yongin-si (KR); Janghyun Song, Yongin-si (KR); Taisun You, Yongin-si (KR)

(73) Assignees: Samsung SDI Co., Ltd., Yongin-si, Gyeonggi-Do (KR); Robert Bosch GmbH, Stuttgart (DE)

( * ) Notice: Subject to any disclaimer, the term of this patent is extended or adjusted under 35 U.S.C. 154(b) by 60 days.

(21) Appl. No.: 13/561,130

(22) Filed: Jul. 30, 2012

(65) Prior Publication Data

US 2013/0252078 A1 Sep. 26, 2013

Related U.S. Application Data

(60) Provisional application No. 61/613,670, filed on Mar. 21, 2012.

(51) Int. Cl.
*H01M 2/02* (2006.01)
*H01M 2/30* (2006.01)
*H01M 2/04* (2006.01)
*H01M 2/06* (2006.01)
*H01M 2/08* (2006.01)
*H01M 2/10* (2006.01)

(52) U.S. Cl.
CPC ............. *H01M 2/0469* (2013.01); *H01M 2/06* (2013.01); *H01M 2/08* (2013.01); *H01M 2/1094* (2013.01); *H01M 2/30* (2013.01); *H01M 2/305* (2013.01)

(58) Field of Classification Search
None
See application file for complete search history.

(56) References Cited

U.S. PATENT DOCUMENTS

| 5,626,984 | A  | * | 5/1997 | Albini ........................... 429/178 |
| 6,204,635 | B1 |   | 3/2001 | Sullivan |
| 2010/0227205 | A1 | * | 9/2010 | Byun et al. ...................... 429/61 |
| 2011/0183165 | A1 | * | 7/2011 | Byun et al. ...................... 429/61 |
| 2011/0183198 | A1 |   | 7/2011 | Byun et al. |
| 2012/0115022 | A1 | * | 5/2012 | Kado et al. .................... 429/179 |

FOREIGN PATENT DOCUMENTS

| EP | 0959508 A1 | 11/1999 |
| EP | 2 458 658 A1 | 5/2012 |
| KR | 10-2011-0037947 A | 4/2011 |
| KR | 10-2011-0087566 A | 8/2011 |

OTHER PUBLICATIONS

European Search Report in EP 12191009.5-1360, dated Mar. 28, 2013 (Kim, et al.).

* cited by examiner

*Primary Examiner* — Patrick Ryan
*Assistant Examiner* — Christopher Domone
(74) *Attorney, Agent, or Firm* — Lee & Morse, P.C.

(57) ABSTRACT

A secondary battery including an electrode assembly; a case accommodating the electrode assembly; a cap plate coupled with the case; a terminal electrically connected to the electrode assembly and extending through the cap plate; and a safety member between the terminal and the cap plate, the safety member having an apex contacting one of the cap plate and the terminal to electrically connect together the cap plate and the terminal.

20 Claims, 18 Drawing Sheets

SECONDARY BATTERY

CROSS-REFERENCE TO RELATED APPLICATION

The present application claims priority under 35 U.S.C. §119(e) to U.S. Provisional Application No. 61/613,670, filed on Mar. 21, 2012, and entitled: "Secondary Battery," which is incorporated herein by reference in its entirety.

BACKGROUND

1. Field

Embodiments relate to a secondary battery.

2. Description of the Related Art

Unlike a primary battery, a secondary battery may be recharged. Low capacity batteries that use single battery cells may be used as power sources for various portable electronic devices, e.g., smart phones and digital cameras. High power batteries that use tens of battery cells connected to each other in a battery pack may be used as, e.g., driving power sources for electric scooters, hybrid electric vehicles (HEV).

Secondary batteries may be classified into different types, e.g., prismatic and cylindrical batteries. A secondary battery may include an electrode assembly including a separator (as an insulator) interposed between a positive plate and a negative plate. The electrode assembly may be inserted or housed inside a case with an electrolyte, and a cap plate may be coupled with the case. Positive and negative electrode terminal portions may be connected to the electrode assembly and may be exposed or protrude to the outside through the cap plate.

SUMMARY

Embodiments are directed to a secondary battery.

The embodiments may be realized by providing a secondary battery including an electrode assembly; a case accommodating the electrode assembly; a cap plate coupled with the case; a terminal electrically connected to the electrode assembly and extending through the cap plate; and a safety member between the terminal and the cap plate, the safety member having an apex contacting one of the cap plate and the terminal to electrically connect together the cap plate and the terminal.

The terminal may extend through a terminal hole in the cap plate. The safety member may protrude inwardly into the terminal hole in the cap plate to contact the terminal with the apex. The secondary battery may include a pair of safety members, the pair of safety members contacting opposing sides of the terminal.

The terminal may include a pair of opposing long sides and a pair of opposing short sides, and the pair of safety members may contact the opposing long sides of the terminal. The terminal may include a pair of opposing long sides and a pair of opposing short sides, and the pair of safety members may contact the opposing short sides of the terminal. The terminal may include a pair of opposing long sides and a pair of opposing short sides, the secondary battery may include a plurality of pairs of safety members, and at least one pair of the plurality of pairs of safety members may contact the terminal along the opposing long sides thereof.

Another pair of the plurality of pairs of safety members may contact the opposing short sides of the terminal. The safety member may protrude from the terminal to contact an inner surface of the terminal hole in the cap plate. The secondary battery may include a pair of safety members, the pair of safety members contacting opposing surfaces of the terminal hole.

The inner surfaces of terminal hole may include a pair of opposing long sides and a pair of opposing short sides, and the pair of safety members may contact the opposing long sides of the inner surface of the terminal hole.

The inner surfaces of terminal hole may include a pair of opposing long sides and a pair of opposing short sides, and the pair of safety members may contact the opposing short sides of the inner surface of the terminal hole.

The inner surfaces of terminal hole may include a pair of opposing long sides and a pair of opposing short sides, the secondary battery may include a plurality of pairs of safety members, and at least one of the plurality of pairs of safety members may contact the inner surface of the terminal hole along the opposing long sides thereof.

Another pair of the plurality of pairs of safety members may contact the opposing short sides of the inner surface of the terminal hole. The safety member may be monolithically formed with the cap plate or the terminal. The safety member may be a separately formed piece on the cap plate or the terminal. The safety member may be formed of a same material as the cap plate or the terminal. The secondary battery may further include an insulating molding resin in the terminal hole. The apex of the safety member may be provided by one of a hemisphere, a pyramid, and a trapezoid.

BRIEF DESCRIPTION OF THE DRAWINGS

Features will become apparent to those of ordinary skill in the art by describing in detail exemplary embodiments with reference to the attached drawings in which:

FIGS. 1b and 1c illustrate cross-sectional views of the secondary battery of FIG. 1a;

DETAILED DESCRIPTION

Figure 1A:
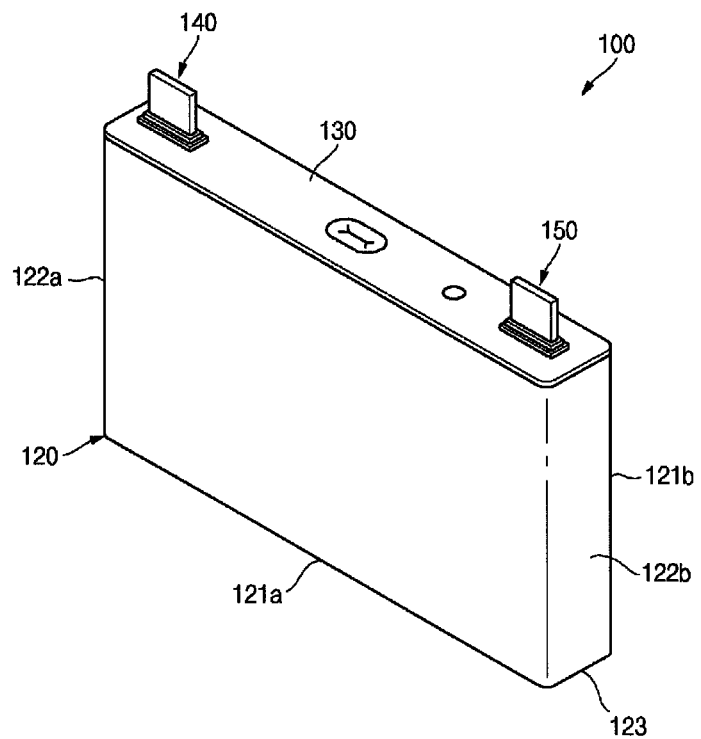
FIG. 1a illustrates a perspective view of a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 1B:
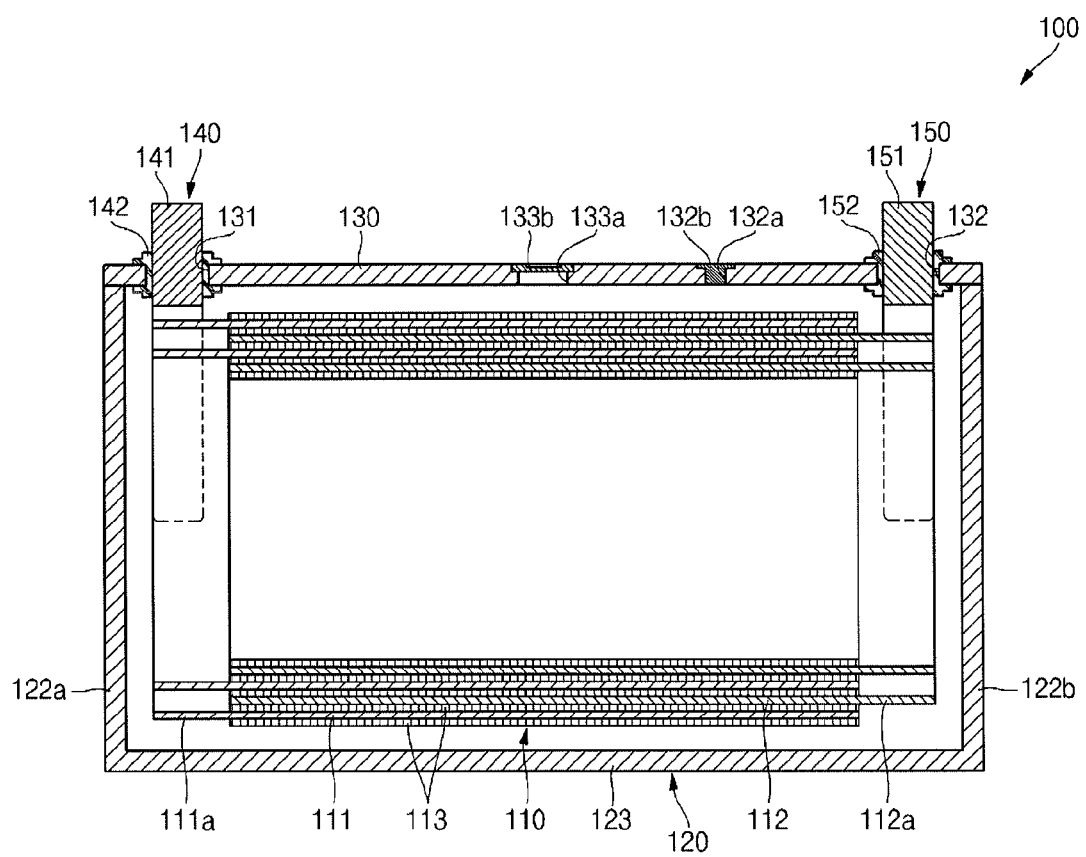
Figure 1C:
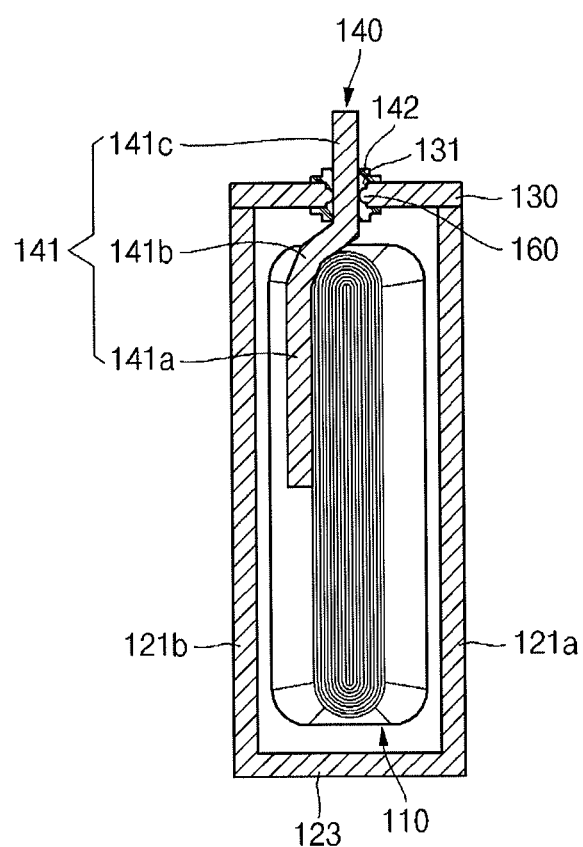
Figure 1D:
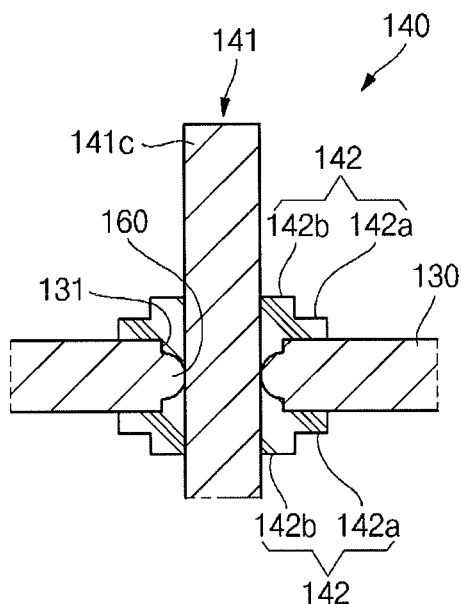
FIG. 1d illustrates an enlarged partial view of FIG. 1 c.

FIG. 1a illustrates a perspective view of a secondary battery according to an embodiment. FIGS. 1b and 1c illustrate cross-sectional views of the secondary battery of FIG. 1a. FIG. 1d illustrates an enlarged partial view of FIG. 1c.

As shown in FIGS. 1a to 1d, the secondary battery 100 according to the present embodiment may include an electrode assembly 110, a case 120, a cap plate 130, a first terminal portion 140, a second terminal portion 150, and a safety member 160.

The electrode assembly 110 may be formed by winding a stack of a first electrode plate 111, a separator 113 and a second electrode plate 112 (which are thin plates or layers) or stacking the first electrode plate 111, the separator 113, and the second electrode plate 112. In an implementation, the first electrode plate 111 may function as a positive electrode, and the second electrode plate 112 may function as a negative electrode, or vice versa.

The first electrode plate 111 may be formed by coating a first electrode active material, e.g., a transition metal oxide, on a first current collector, e.g., aluminum foil. The first electrode plate 111 may include a first uncoated portion 111a (that is not coated with a first electrode material). The first uncoated portion 111a may correspond to a path of current flow between the first electrode plate 111 and a first terminal portion 140 to be described below.

The second electrode 112 may be formed by coating a second electrode active material, e.g., graphite or carbon, onto a second electrode collector made of a metal foil, e.g., nickel or copper. The second electrode 112 may include a second uncoated portion 112a (that is not coated with the second active material). The second uncoated portion 112a may correspond to a path of current flow between the second electrode plate 112 and a second terminal portion 150 to be described below.

The first electrode plate 111 and the second electrode plate 112 may have different polarities.

The separator 113 (located between the positive and negative electrode plates 111 and 112) may prevent short circuits between the electrode plates, and may facilitate movement of lithium ions. In an implementation, the separator 113 may be made of, e.g., polyethylene, polypropylene, or a composite film of polyethylene and polypropylene.

The first terminal portion 140 and the second terminal portion 150 may be electrically connected to the first electrode plate 111 and the second electrode plate 112, respectively, and may be formed at opposite ends of the electrode assembly 110.

The electrode assembly 110 may be accommodated in the case 120 together with an electrolyte. The electrolyte may include an organic solvent (e.g., ethylene carbonate (EC), propylene carbonate (PC), diethyl carbonate (DEC), ethyl methyl carbonate (EMC), and/or dimethyl carbonate (DMC)) and a lithium salt (e.g., $LiPF_6$ or $LiBF_4$). In an implementation, the electrolyte may be in a liquid, solid, or gel phase.

The case 120 may be made of a conductive metal, e.g., aluminum, an aluminum alloy, steel, a steel alloy, nickel plated steel, a nickel plated steel alloy, or the like. The case 120 may have a substantially hexagonal or hexahedral structure having an open top portion so as to receive the electrode assembly 110 and portions of the first terminal portion 140 and the second terminal portion 150. For example, the case 120 may include a pair of long side regions 121a and 121b (which are relatively wide regions), a pair of short side regions 122a and 122b (which are relatively narrow regions and connect the pair of long side regions 121a and 121b), and a bottom region 123 (connecting the long side regions 121a and 121b and the short side regions 122a and 122b). The first uncoated portion 111a of the electrode assembly 110 may extend by a predetermined length toward the short side region 122a, and the second uncoated portion 112a may extend by a predetermined length toward the short side region 122b. In an implementation, the first terminal portion 140 may be formed in the vicinity of the short side region 122a of the case 120, and the second terminal portion 150 may be formed in the vicinity of the short side region 122b of the case 120.

An inner surface of the case 120 may be insulated so that the case 120 is insulated from the electrode assembly 110, the first terminal portion 140, and the second terminal portion 150. In a state in which the electrode assembly 110, the first terminal portion 140, and the second terminal portion 150 are accommodated in an insulating bag (not shown), the electrode assembly 110, the first terminal portion 140, and the second terminal portion 150 may be positioned within the case 120.

The cap plate 130 may be coupled with the case 120 at the open top portion thereof by, e.g., laser welding. Accordingly, the case 120 and the cap plate 130 may be electrically connected to each other. In an implementation, the cap plate 130 may be made of the same material as the case 120. In an implementation, the cap plate 130 and the first terminal portion 140 may be electrically connected to each other. Accordingly, the cap plate 130 and the first terminal portion 140 may have the same polarity. Therefore, the case 120 and the cap plate 130 may have the same polarity. Alternatively, the cap plate 130 and the second terminal portion 150 may be electrically connected to each other. Accordingly, the case 120 and the second terminal portion 150 may have the same polarity. In an implementation, the first terminal portion 140 and the second terminal portion 150 may not be electrically connected to the cap plate 130 at the same time.

The cap plate 130 may include a first terminal hole 131 (penetrating the cap plate 130 to accommodate the first terminal portion 140) and a second penetration hole 132 (penetrating the cap plate 130 to accommodate the second terminal portion 150). In addition, the cap plate 130 may further include an injection hole 132a (for supplying an electrolyte) and a plug 132b (coupled with the injection hole 132a). In addition, when an internal pressure of the case 120 exceeds a reference pressure, a safety vent 133b in a vent hole 133a in the cap plate 130 may burst, thereby easily discharging internal gases to the outside. For example, the safety vent 133b may be relatively thin and may be coupled with the cap plate 130 at the vent hole 133a.

The first terminal portion 140 may be electrically connected to the first uncoated portion 111a of the electrode assembly 110. The first terminal portion 140 may include a first terminal 141 extending a predetermined length from the cap plate 130 while penetrating the first terminal hole 131 of the cap plate 130, and an insulating molding resin 142 formed in the first terminal hole 131 and on a surface of the cap plate 130 around the first terminal hole 131.

A part of the first terminal 141 may be positioned within the case 120 and may include a first region 141a (electrically connected to the first uncoated portion 111a of the electrode assembly 110), a second region 141b (bent a predetermined angle and extending from the first region 141a), and a third region 141c (bent a predetermined angle and extending from the second region 141b toward the outside of the cap plate 130 while penetrating the first penetration hole 131 of the cap plate 130). The third region 141c may be connected to an external device (e.g., a bus bar).

The first terminal 141 may be made of a same material as the first uncoated portion 111a. For example, when the first uncoated portion 111a is made of aluminum or an aluminum alloy, the first terminal 141 may also be made of aluminum or an aluminum alloy. In an implementation, when the first uncoated portion 111a is made of copper, a copper alloy, nickel or a nickel alloy, the first terminal 141 may also be made of copper, a copper alloy, nickel or a nickel alloy. If the first terminal 141 and the first uncoated portion 1111a are made of the same material, the first terminal 141 may be easily welded to the first uncoated portion 111a.

The insulating molding resin 142 may be formed in the first terminal hole 131 and may surround the third region 141c of the first terminal 141. In an implementation, the insulating molding resin 142 may be formed on a top and bottom surface of the cap plate 130 around the first terminal hole 131 to a predetermined thickness. For example, the insulating molding resin 142 may include a first region 142a (relatively close to the first terminal hole 131 and having a relatively large width) and a second region 142b (relatively far from the first terminal hole 131 and having a relatively small width). As described above, the first region 142a of the insulating molding resin 142 may be in close contact with the top and bottom surfaces of the cap plate 130. Thus, a coupling force between the cap plate 130 and the first terminal 141 may be improved, thereby improving sealing efficiency of the case 120.

In an implementation, the insulating molding resin 142 may be formed of a material that can be applied to a molding process without reacting with an electrolyte. For example, the insulating molding resin 142 may include one selected from the group of fluorine resin, polyethylene (PE) resin, polypropylene (PP) resin, ethylene propylene diene monomer (EPDM) resin, and equivalents thereof.

The second terminal portion 150 may be electrically connected to the second uncoated portion 112a of the electrode assembly 110 and may include a second terminal 142 extending a predetermined length from the cap plate 130 while penetrating the second terminal hole 132 of the cap plate 130, and an insulating molding resin 152 formed in the second terminal hole 132 and on the surface of the cap plate 130 around the second terminal hole 132. The second terminal portion 150 may have substantially the same shape and configuration of the first terminal portion 140. Thus, a repeated detailed description thereof may be omitted. In an implementation, when the first terminal portion 140 is electrically connected to the cap plate 130, the second terminal portion 150 may not be electrically connected to the cap plate 130. For example, when the first terminal portion 140 has a safety member 160, the second terminal portion 150 may have no safety member.

The safety member 160 may be formed between the cap plate 130 and the first terminal portion 140. The safety member 160 may electrically connect the cap plate 130 to the first terminal portion 140. For example, the safety member 160 may be formed in the first terminal hole 131 and may electrically connect the cap plate 130 to the first terminal portion 140, e.g., the first terminal 141. In an implementation, the safety member 160 may inwardly protrude and may extend a predetermined length from the inner wall of the first terminal hole 131 in the cap plate 130. Accordingly, the safety member 160 may contact or may be connected to the first terminal portion 140, e.g., the first terminal 141. For example, the safety member 160 may include a portion extending from the cap plate 130 and may be made of the same material as the cap plate 130. In an implementation, the safety member 160 may have a shape such that an apex contacts the first terminal 141 to electrically connect the cap plate 130 and the first terminal 141.

In an implementation, when the case 120 and the cap plate 130 are made of aluminum or an aluminum alloy, the safety member 160 (also made of aluminum or an aluminum alloy) may contact or may be connected to the first terminal 141. For example, the first terminal 141 may be made of aluminum or an aluminum alloy. In general, when the case 120 and the cap plate 130 are made of aluminum or an aluminum alloy, the case 120 and the cap plate 130 may be used as a positive electrode. Therefore, a positive electrode terminal may contact or may be connected to the cap plate 130 through the safety member 160.

In an implementation, when the case 120 and the cap plate 130 are made of steel, a steel alloy, nickel plated steel, a nickel plated steel alloy, or the like, the safety member 160 (also made of steel, a steel alloy, nickel plated steel, a nickel plated steel alloy, or the like) may contact or may be connected to the first terminal 141. Here, the first terminal 141 may be made of copper or a copper alloy. In general when the case 120 and the cap plate 130 are made of steel, a steel alloy, nickel plated steel, a nickel plated steel alloy, or the like, the case 120 and the cap plate 130 may be used as a negative electrode. Therefore, a negative electrode terminal may be connected to the cap plate 130 through the safety member 160.

As described above, the case 120 and the cap plate 130 may be electrically connected to the first terminal 141 of the first terminal portion 140 or the second terminal 151 of the second terminal portion 150 through the safety member 160. Thus, the case 120 and the cap plate 130 may not reach corrosion potentials, thereby reducing and/or preventing corrosion of the case 120 and the cap plate 130. In addition, the safety member 160 (positioned between the cap plate 130 and the first terminal 141 or the second terminal 151) may have a relatively small sectional area and/or a relatively high contact resistance with the terminal 141 or 151, thereby restricting current flowing from the terminal 141 or 151 to the cap plate 130 in the event of nail penetration or crush of the secondary battery. Accordingly, an arc between the terminal 141 or 151 and the cap plate 130 in the event of nail penetration or crush of the secondary battery may be prevented, thereby improving the penetration safety of the secondary battery.

Figure 2A:
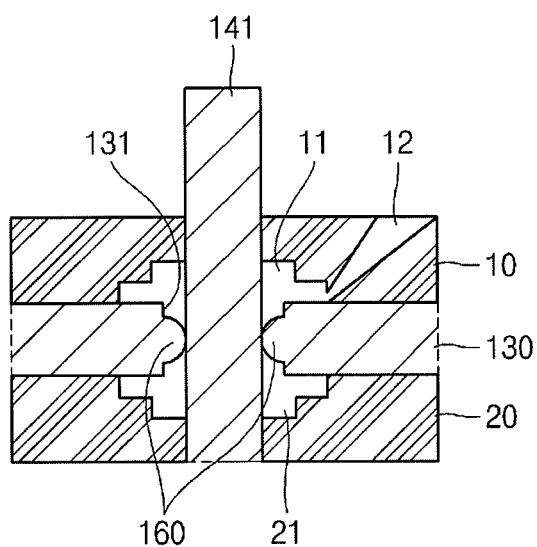
FIGS. 2a and 2b illustrate cross-sectional views of stages in a method of coupling a cap plate and a terminal portion using an insert molding method.
Figure 2B:
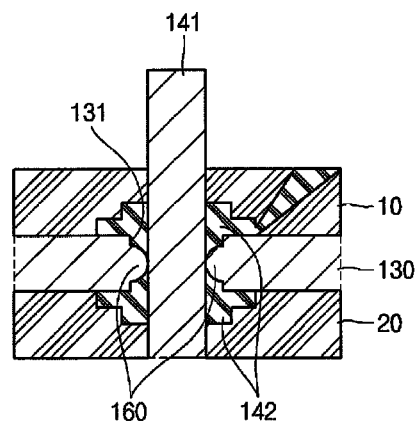
Figure 2C:
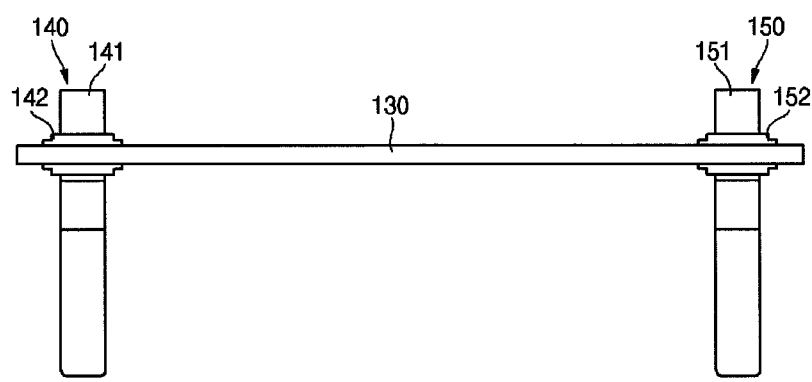
FIG. 2c illustrates a side view of a coupled cap plate and terminal portion in a completed state.

FIGS. 2a and 2b illustrate cross-sectional views of stages in a method of coupling a cap plate and a terminal portion using an insert molding method. FIG. 2c illustrates a side view of a coupled cap plate and terminal portion in a completed state.

As shown in FIG. 2a, a first mold 10 having a first cavity 11 and a second mold 20 having a second cavity 21 may be provided. A gate 12 (having a narrow entrance) may allow the insulating molding resin 142 (being at high temperature) to be provided in the first cavity 11 of the first mold 10. In addition, the cap plate 130 (having the terminal hole 131 and the terminal 141 coupled with or extending through the terminal hole 131) may be positioned between the first mold 10 and the second mold 20. In an implementation, the safety member 160 may be formed between the cap plate 130 and the terminal 141. For example, the cap plate 130 and the terminal 141 may be electrically connected to each other by the safety member 160.

As shown in FIG. 2b, the high-temperature insulating molding resin 142 may be injected into the first cavity 11 and the second cavity 21 at high pressure through the gate 12. As described above, the first cavity 11 and the second cavity 21 may be connected to each other. Thus, the insulating molding resin 142 injected into the first cavity 11 may flow to the second cavity 21. Next, if temperatures of the first and second molds 10 and 20 are lowered, the insulating molding resin 142 may be hardened. Therefore, the insulating molding resin 142 may be formed not only in the terminal hole 131 of the cap plate 130, but also on the top surface of the cap plate 130 around the terminal hole 131 and the bottom surface of the cap plate 130 to a predetermined thickness.

As shown in FIG. 2c, the cap plate 130, the first terminal portion 140, and the second terminal portion 150 may be removed from the first mold 10 and the second mold 20, thereby obtaining the cap plate 130, the first terminal portion 140, and the second terminal portion 150 (which may be integrally formed or coupled together). For example, according to the present embodiment, in a state in which the cap plate 130, the first terminal portion 140, and the second terminal portion 150 are coupled by the insulating molding resin 142 using an insert molding method, an assembling process of the secondary battery may be simplified. For example, numbers of components of the first terminal portion 140 and the second terminal portion 150 may be relatively small. Thus, the assembling process of the secondary battery may be simplified.

FIGS. 3a to 3d illustrate partial cross-sectional views of various safety members according to an embodiment.

Figure 3A:
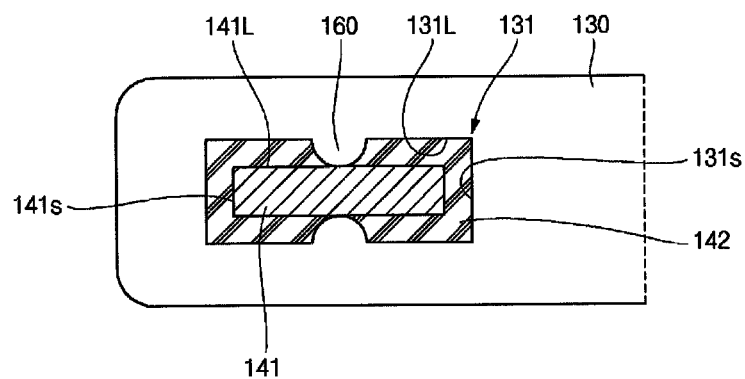
FIGS. 3a to 3d illustrate partial cross-sectional views of various safety members according to an embodiment.

As shown in FIG. 3a, a plane of the terminal hole 131 in the cap plate 130 may have a rectangular shape having long sides 131L and short sides 131S. In addition, a plane of the terminal 141 penetrating the terminal hole 131 may also have a rectangular shape having long sides 141L and short sides 141S. In an implementation, while an interior of the terminal hole 131 may be filled with the insulating molding resin 142 to surround the terminal 141, the terminal 141 may be fixed to the cap plate 130. In an implementation, the cap plate 130 and the terminal 141 may be made of the same material, For example, when the cap plate 130 is made of aluminum or an aluminum alloy, the terminal 141 may also be made of aluminum or an aluminum alloy.

In an implementation, the cap plate 130 and the terminal 141 may be made of different materials. For example, when the cap plate 130 is made of steel, a steel alloy, nickel plated steel, a nickel plated steel alloy, or the like, the terminal 141 may be made of copper or a copper alloy. For example, even when the cap plate 130 is made of copper or a copper alloy (which may be expensive or susceptible to oxidation), steel, a steel alloy, nickel plated steel, a nickel plated steel alloy, or the like may be used for the cap plate 130, instead of copper or a copper alloy.

The safety member 160 may protrude and extend a predetermined length from the cap plate 130 to the terminal 141 so that it the apex thereof may contact or may be connected to the terminal 141. In an implementation, the safety member 160 may be made of the same material as the cap plate 130. For example, when the cap plate 130 is made of aluminum or an aluminum alloy, the safety member 160 may also be made of aluminum or an aluminum alloy. In an implementation, when the cap plate 130 is made of steel, a steel alloy, nickel plated steel, a nickel plated steel alloy, or the like, the safety member 160 may also be made of steel, a steel alloy, nickel plated steel, a nickel plated steel alloy, or the like. The safety member 160 may protrude and extend a predetermined length from each long side 131L of the terminal hole 131 to each long side 141L of the terminal 141, and may contact or may be connected to each long side 141L of the terminal 141. For example, the safety member 160 may have a semi-circular or hemispherical shape protruding from the cap plate 130 to the terminal 141 and may contact the terminal 141 with an apex thereof. For example, a circumferential surface or apex of the hemispherical safety member 160 may contact or may be connected to the terminal 141. Therefore, a contact area between the cap plate 130 and the terminal 141 may be relatively small, thereby increasing contact resistance. As described above, the cap plate 130 (case) may have the same polarity with the terminal 141. Thus, corrosion of the cap plate 130 (case) may be reduced and/or prevented. In addition, a relatively small amount of current may flow from the terminal 141 to the cap plate 130 in the event of nail penetration or crush. Thus, penetration safety may be improved. In an implementation, the safety member 160 may have, e.g., a triangular or pyramid shape, a rectangular shape, a trapezoidal shape, or the like.

Figure 3B:
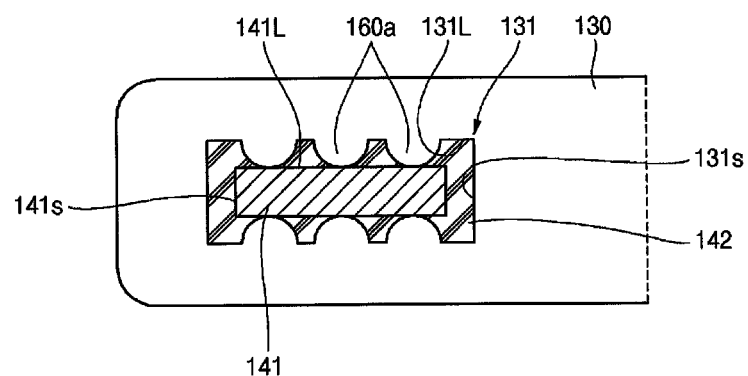

In an implementation, as shown in FIG. 3b, a plurality of safety members 160a may be included. For example, multiple pairs of safety members 160a may protrude and extend a predetermined length from each long side 131L of the terminal hole 131 to each long side 141L of the terminal 141, and may contact or may be connected to each long side 141L of the terminal 141. For example, each pair of safety members 160 a may contact opposing sides of the terminal 141.

Figure 3C:
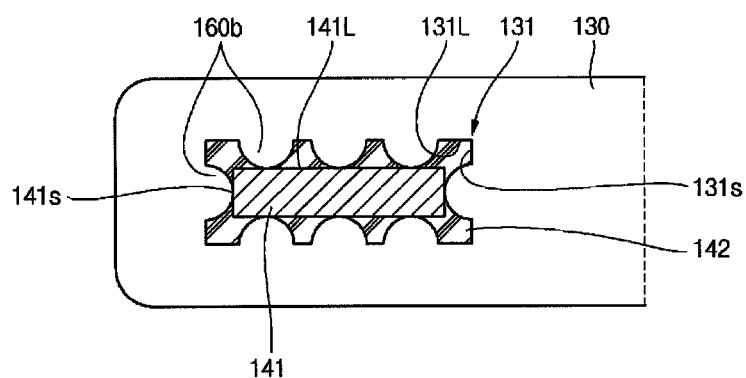

As shown in FIG. 3c, safety members 160b may be formed between each long side 131L of the terminal hole 131 and each long side 141L of the terminal 141 as well as between each short side 131S of the terminal hole 131 and each short side 141S of the terminal 141. For example, the safety members 160b may contact or may be connected to each long side 141L of the terminal 141 and each short side 141S of the terminal 141.

Figure 3D:
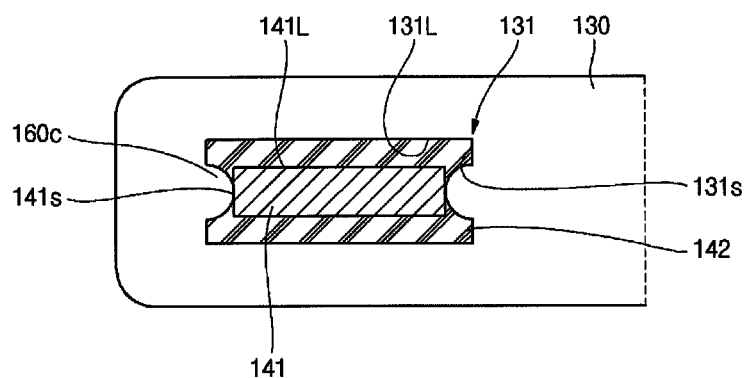

Finally, as shown in FIG. 3d, safety members 160c may protrude and extend a predetermined length from each short side 131S of the terminal hole 131 to each short side 141S of the terminal 141, and may contact or may be connected to each long side 141S of the terminal 141. For example, the safety members 160c may not be formed between long sides 131L of the terminal hole 131 and long sides 141L of the terminal 141.

FIGS. 4a to 4d illustrate partial cross-sectional views of various safety members according to an embodiment.

Figure 4A:
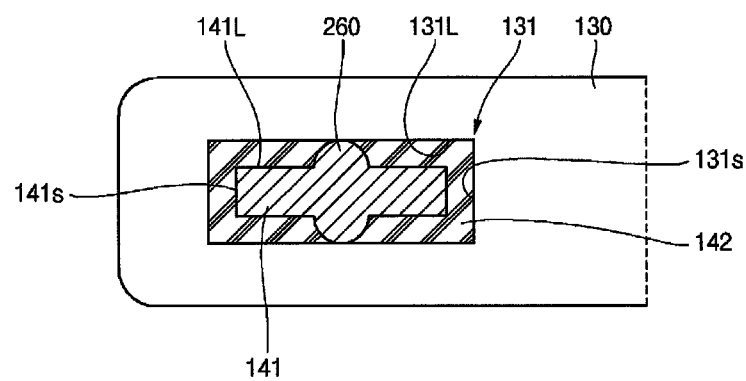
FIGS. 4a to 4d illustrate partial cross-sectional views of various safety members according to an embodiment.

As shown in FIG. 4a, a safety member 260 may protrude and extend a predetermined length from the terminal 141 to the long sides 131L of the terminal hole 131 in the cap plate 130 so that it may contact or may be connected to the cap plate 130 at the apex thereof. For example, the safety member 260 may be a portion of the terminal 141 that extends outwardly therefrom. The safety member 260d may be made of the same material as the terminal 141. For example, when the terminal 141 is made of aluminum or an aluminum alloy, the safety member 260 may also be made of aluminum or an aluminum alloy. In addition, when the terminal 141 is made of copper or a copper alloy, the safety member 260 may also be made of copper or a copper alloy.

In an implementation, the safety member 260 may protrude and extend a predetermined length from each long side 141L of the terminal 141 to each long side 131L of the terminal hole 131, and may contact or may be connected to the cap plate 130. For example, the safety member 260 may have a semi-circular or hemispherical shape protruding from the terminal 141 to the cap plate 130. In an implementation, a circumferential surface or apex of the safety member 260 may contact or may be connected to the long sides 131L of the terminal hole 131. Accordingly, a contact area between the cap plate 130 and the terminal 141 may be relatively small, thereby increasing contact resistance. The cap plate 130 (case) may have the same polarity with the terminal 141. Thus, corrosion of the cap plate 130 (case) may be reduced and/or prevented. In addition, a relatively small amount of current may flow from the terminal 141 to the cap plate 130 in the event of nail penetration or crush. Thus, penetration safety may be improved.

Figure 4B:
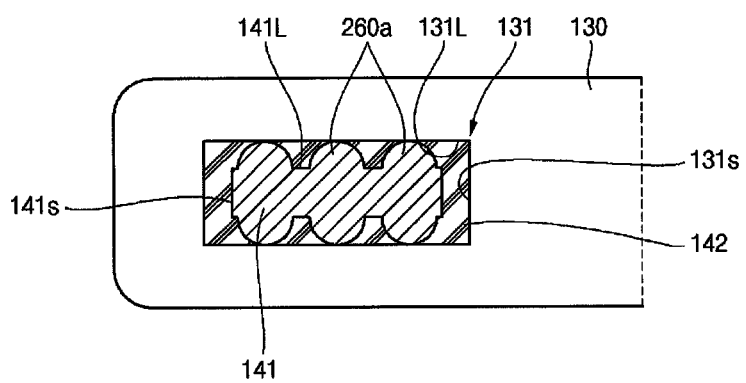

In an implementation, as shown in FIG. 4b, a plurality of safety members 260a may be included. For example, multiple pairs safety members 260a may protrude and extend a predetermined length from each long side 141L of the terminal 141 to each long side 131L of the terminal hole 131, and may contact or may be connected to the cap plate 130. For example, each pair of safety members 260a may contact opposing sides of the terminal hole 131.

Figure 4C:
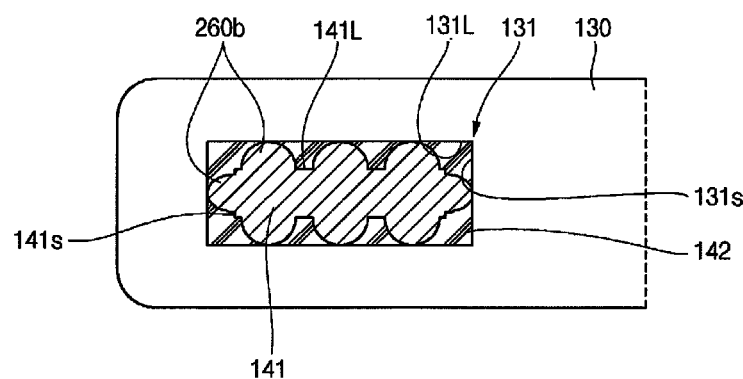

In an implementation, as shown in FIG. 4c, the safety members 260b may be formed between each long side 141L of the terminal 141 to each long side 131L of the terminal hole 131 as well as between each short side 141S of the terminal 141 and each short side 131S of the terminal hole 131. For example, the safety members 260b may contact or may be connected to each long side 131L and each short side 131S of the terminal hole 131.

Figure 4D:
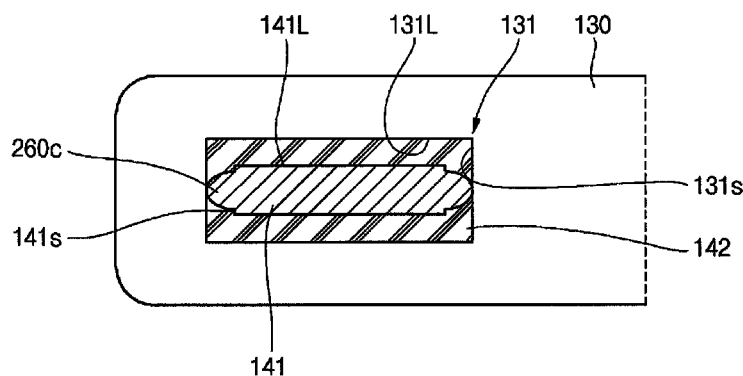

Finally, as shown in FIG. 4d, a safety member 260c may protrude and extend a predetermined length from each short side 141S of the terminal 141 to each short side 131S of the terminal hole 131, and may contact or may be connected to the cap plate 130. For example, the safety member 260c may not be formed between long sides 141L of the terminal 141 and long sides 131L of the terminal hole 131.

FIGS. 5a to 5d illustrate partial cross-sectional views of various safety members according to an embodiment.

Figure 5A:
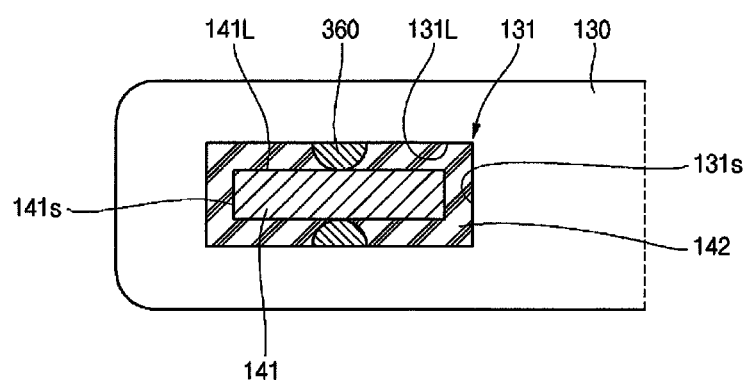
FIGS. 5a to 5d illustrate partial cross-sectional views of various safety members according to an embodiment.

As shown in FIG. 5a, safety members 360 may protrude and extend a predetermined length from the inner wall of the terminal hole 131 of the cap plate 130 to the terminal 141, and may contact or may be connected to the terminal 141 at the apex thereof. However, the safety members 360 may be made of a material different from that of the cap plate 130 and the terminal 141. In an implementation, when the cap plate 130 is made of aluminum or an aluminum alloy, the safety member 360 may be made of steel, a steel alloy, nickel plated steel, a nickel plated steel alloy, or the like, which may have a relatively large resistance.

In an implementation, the safety members 360 may protrude and extend a predetermined length from each long side 131L of the terminal hole 131 to each long side 141L of the terminal 141, and may contact or may be connected to each long side 141L of the terminal 141. For example, the safety members 360 may have a semi-circular or hemispherical shape protruding from the cap plate 130 to the terminal 141 to contact the terminal 141 with the apex thereof. For example, a circumferential surface of the safety member 360, e.g., the apex, may contact the terminal 141. Accordingly, a contact area between the cap plate 130 and the terminal 141 may be minimized, thereby increasing contact resistance.

As described above, the cap plate 130 (case) may have the same polarity as the terminal 141. Thus, corrosion of the cap plate 130 (case) may be reduced and/or prevented. In addition, a relatively small amount of current may flow from the terminal 141 to the cap plate 130 in the event of nail penetration or crush. Thus, penetration safety can further improved. In an implementation, the safety members 360 may have a shape selected from the group of a triangular or pyramid shape, a rectangular shape, a trapezoidal shape, or the like.

Figure 5B:
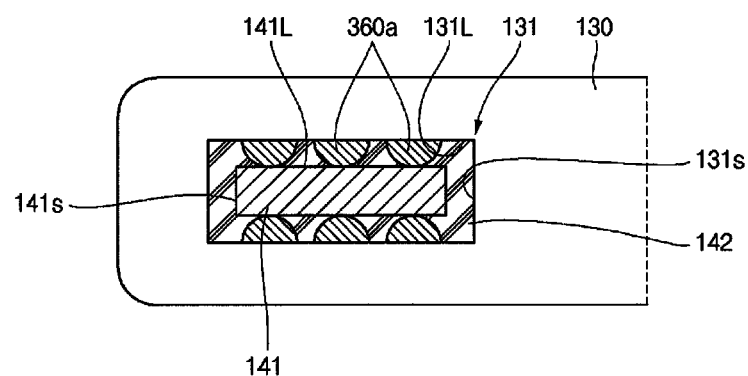

In an implementation, as shown in FIG. 5b, a plurality of safety members 360a may be included. For example, multiple pairs of safety members 360a may protrude and extend a predetermined length from each long side 131L of the terminal hole 131 to each long side 141L of the terminal 141, and may contact or may be connected to each long side 141L of the terminal 141. For example, each pair of safety members 360a may contact opposing sides of the terminal 141

Figure 5C:
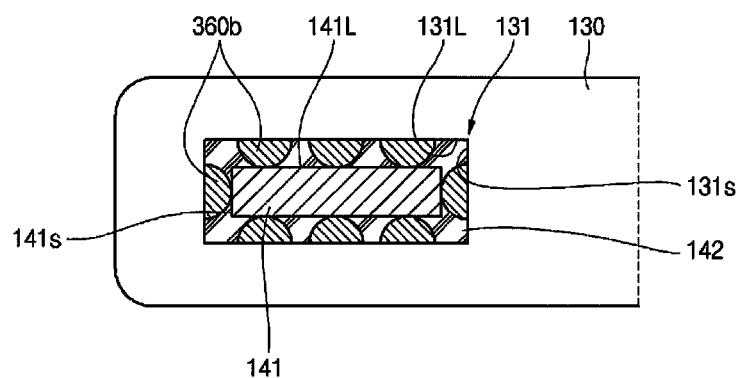

In an implementation, as shown in FIG. 5c, safety members 360b may be formed between each long side 131L of the terminal hole 131 and each long side 141L of the terminal 141 as well as between each short side 131S of the terminal hole 131 and each short side 141S of the terminal 141. For example, pairs of safety members 360b may contact or may be connected to each long side 141L of the terminal 141 and each short side 141S of the terminal 141.

Figure 5D:
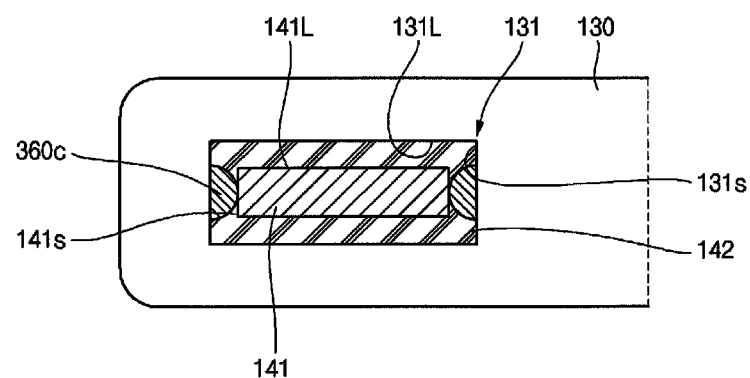

In an implementation, as shown in FIG. 5d, safety members 360c may protrude and extend a predetermined length from each short side 131S of the terminal hole 131 to each short side 141S of the terminal 141, and may contact or may be connected to each long side 141S of the terminal 141 at the apex thereof. For example, the safety members 360c may not be formed between long sides 131L of the terminal hole 131 and long sides 141L of the terminal 141.

FIGS. 6a to 6d illustrate partial cross-sectional views of various safety members according to an embodiment.

Figure 6A:
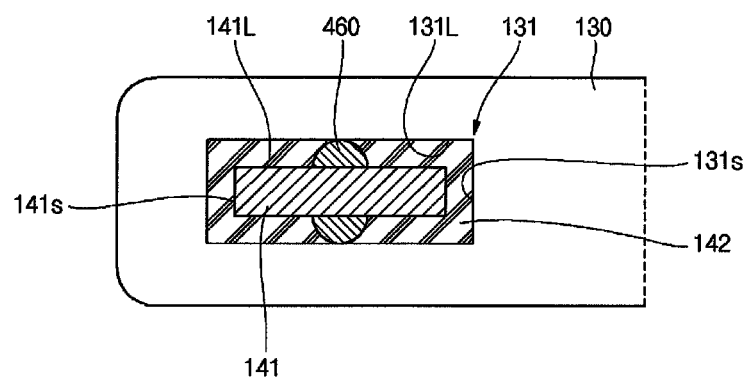
FIGS. 6a to 6d illustrate partial cross-sectional views of various safety members according to an embodiment.

As shown in FIG. 6a, safety members 460 may protrude and extend a predetermined length from the terminal 141 to the cap plate 130, and may contact or may be connected to the long side 131L of the terminal hole 131. However, the safety members 460 may be made of a different material from that of the terminal 141. For example, when the terminal 141 is made of aluminum or an aluminum alloy, the safety members 460 may be made of steel, a steel alloy, nickel plated steel, a nickel plated steel alloy, or the like, which has a relatively large resistance.

In an implementation, the safety members 460 may protrude and extend a predetermined length from each long side 141L of the terminal 141 to the cap plate 130, and may contact or may be connected to each long side 131L of the terminal hole 131 at the apex thereof. For example, the safety members 460 may have a semi-circular or hemispherical shape protruding from the terminal 141 to the inner wall of the terminal hole 131 of the cap plate 130. A circumferential surface, e.g., the apex, of the safety member 460 may contact the long side 131L of the terminal hole 131. Therefore, a contact area between the cap plate 130 and the terminal 141 may be minimized, thereby increasing contact resistance. As described above, the cap plate 130 (case) may have the same polarity as the terminal 141. Thus, corrosion of the cap plate 130 (case) may be prevented. In addition, a relatively small amount of current may flow from the terminal 141 to the cap plate 130 in the event of nail penetration or crush. Thus, penetration safety may be further be improved. In an implementation, the safety members 460 may have a shape selected from the group of a triangular or pyramid shape, a rectangular shape, a trapezoidal shape, or the like.

Figure 6B:
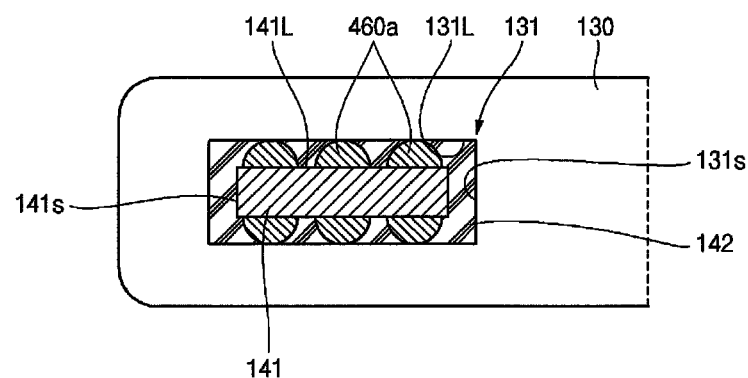

In an implementation, as shown in FIG. 6b, multiple safety members 460a may be included. For example, pairs of the safety members 460a may protrude and extend a predetermined length from each long side 141L of the terminal 141 to each long side 131L of the terminal hole 131, and may contact or may be connected to each long side 131L of the terminal hole 131 at the apex thereof. For example, each pair of safety members 160 a may contact opposing sides of the terminal hole 131.

Figure 6C:
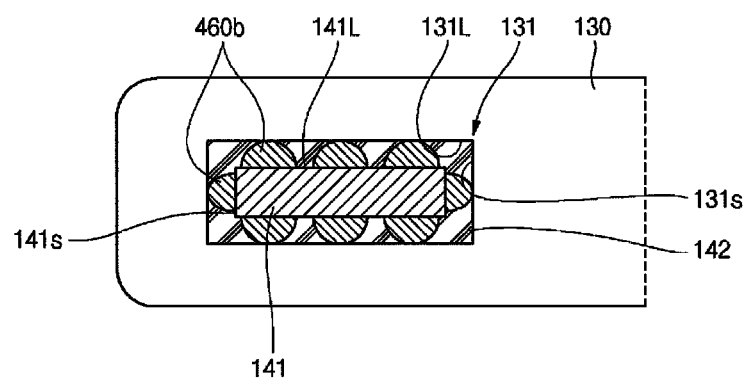

In an implementation, as shown in FIG. 6c, pairs of safety members 460b may be formed between each long side 131L of the terminal hole 131 and each long side 141L of the terminal 141 as well as between each short side 131S of the terminal hole 131 and each short side 141S of the terminal 141. For example, apexes of the safety members 460b may contact or may be connected to each long side 131L of the terminal hole 131 and each short side 131S of the terminal hole 131.

Figure 6D:
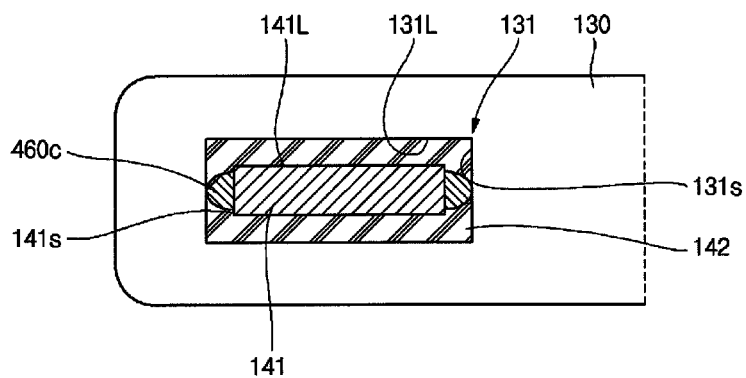

In an implementation, as shown in FIG. 6d, safety members 460c may protrude and extend a predetermined length from each short side 141S of the terminal 141 to each short side 131S of the terminal hole 131, and apexes thereof may contact or may be connected to each short side 131S of the terminal hole 131. For example, the safety members 460c may not be formed between the long sides 141L of the terminal 141 and the long sides 131L of the terminal hole 131.

Figure 7:
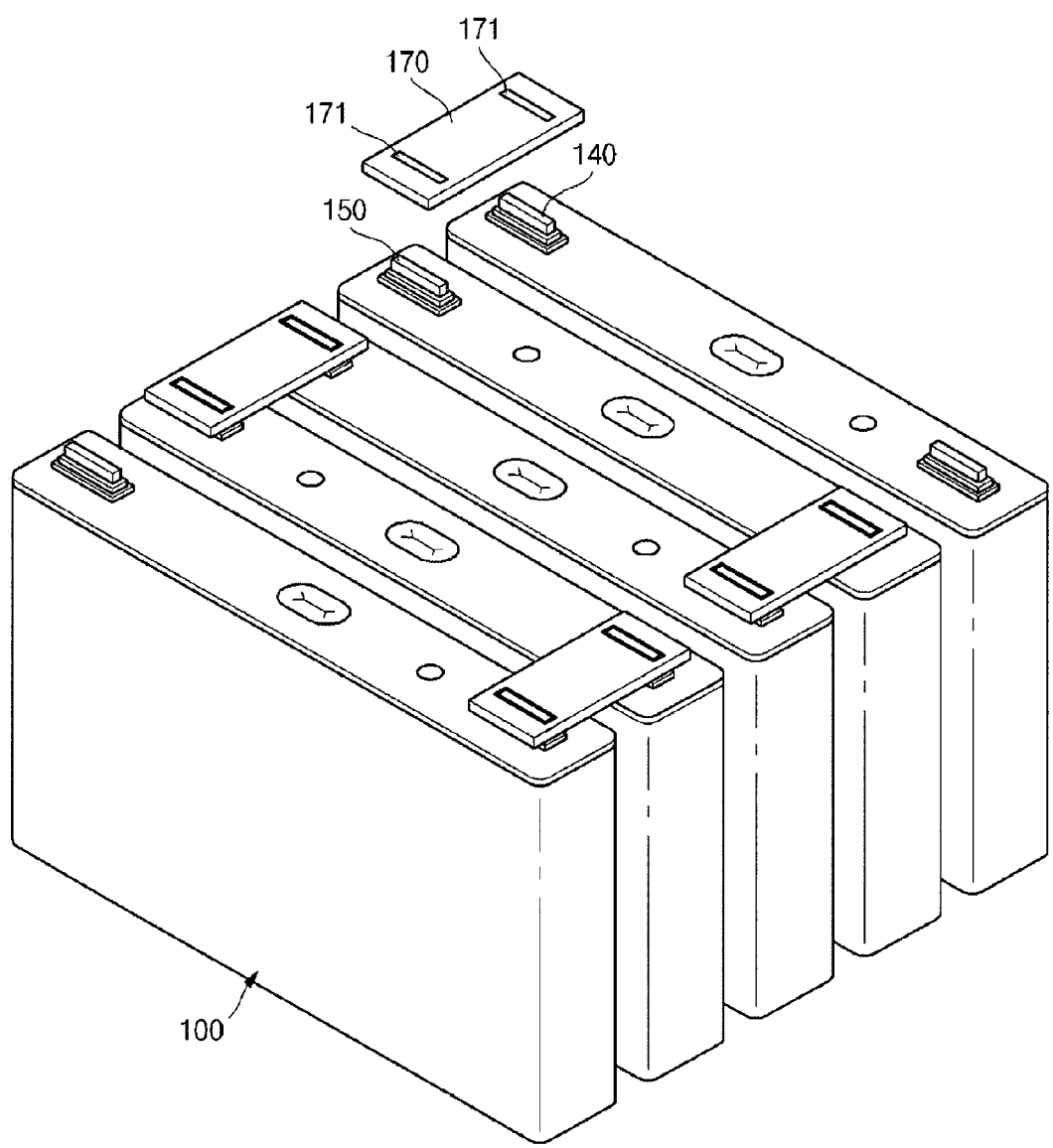
FIG. 7 illustrates a perspective view of a state in which multiple secondary batteries are connected to each other by a bus bar according to an embodiment.
Figure 8:
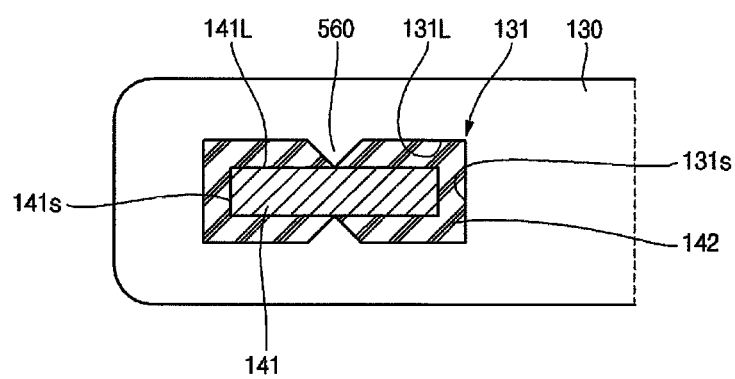
FIGS. 8 to 15 illustrate partial cross-sectional views of various safety members according to an embodiment.
Figure 9:
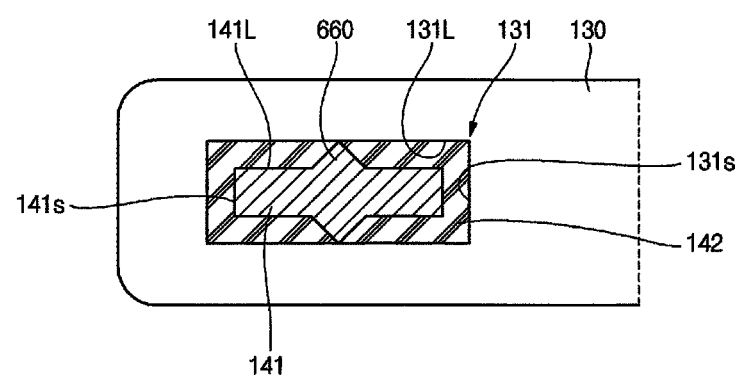
Figure 10:
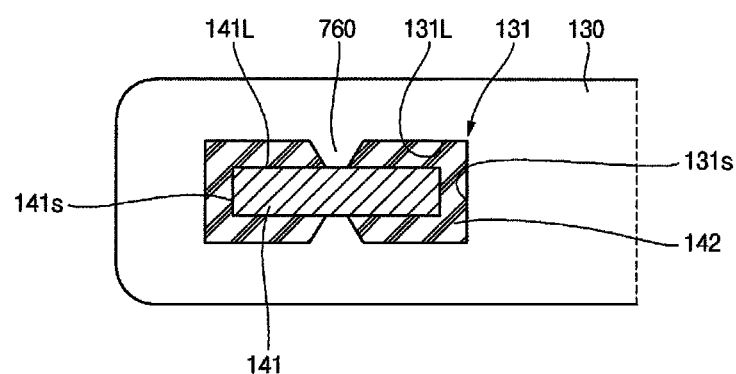
Figure 11:
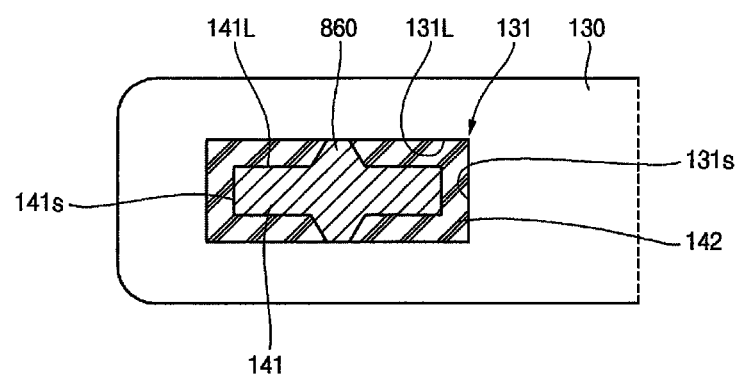
Figure 12:
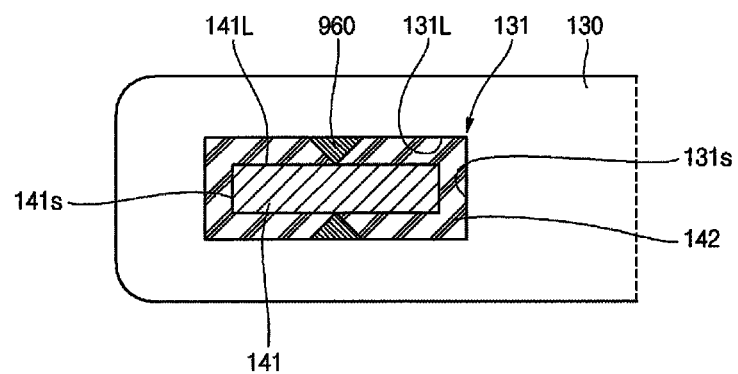
Figure 13:
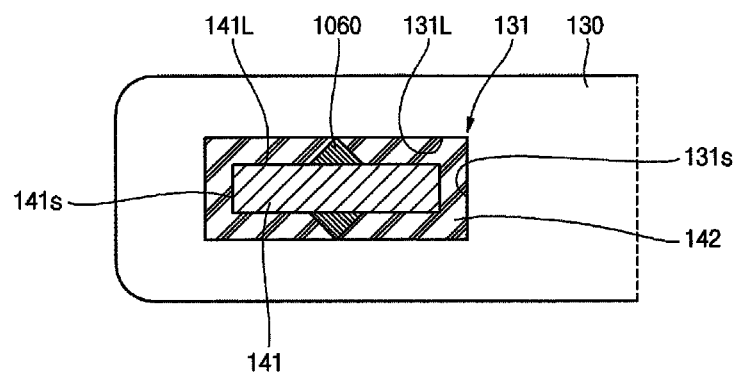
Figure 14:
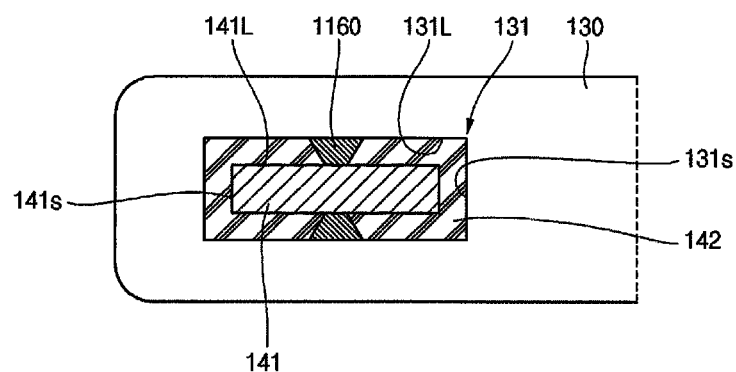
Figure 15:
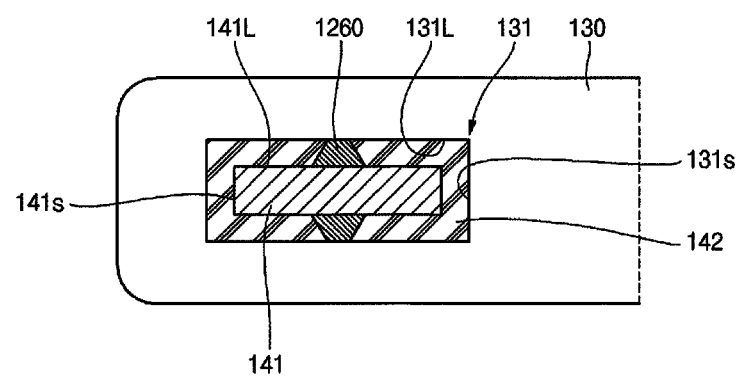

FIG. 7 illustrates a perspective view of a state in which multiple secondary batteries are connected to each other by a bus bar according to an embodiment.

As shown in FIG. 7, the multiple secondary batteries 100 may be horizontally arranged and may be electrically connected to each other by bus bars 170. In an implementation, the multiple secondary batteries 100 may be connected to each other in series. Each of the bus bars 170 may have a substantially rectangular plate shape, and penetration holes 171 may be formed at opposite ends thereof so as to be coupled with terminal portions 140 and 150. The terminal portion 140 may have a substantially rectangular sectional shape. Thus, the penetration hole 171 may also have a substantially rectangular shape.

After the terminal portions 140 and 150 are coupled with the penetration holes 171 (at the opposite ends of the bus bar 170), laser beams may be irradiated into coupling regions of the terminal portions 140 and 150 and the bus bar 170 so as to help prevent the terminal portions 140 and 150 from being separated from the bus bar 170, thereby coupling the terminal portions 140 and 150 with the bus bars 170.

The bus bar 170 may be made of, e.g., one selected from the group of aluminum, an aluminum alloy, copper, a copper alloy, and equivalents thereof.

FIGS. 8 to 15 illustrate partial cross-sectional views of various safety members according to an embodiment. For example, FIGS. 8 to 15 illustrate embodiments in which the safety members 560, 660, 760, 860, 960, 1060, 1160, and 1260 have a pyramid or trapezoidal shape.

The embodiments provide a secondary battery, in which corrosion of a case may be prevented and penetration safety may be improved.

The embodiments also provide a secondary battery, in which a length of a current path and current resistance may be reduced.

The embodiments also provide a secondary battery, in which a size of an electrode assembly may be increased by reducing volumes of terminal portions.

The embodiments also provide a secondary battery, in which assembling performance of a terminal portion and sealing efficiency of a case may be improved.

In the secondary battery according to an embodiment, the at least one terminal portion may be electrically connected to the cap plate and/or case through a safety member, so that the at least one terminal portion and the cap plate and/or case have the same electric potential. Accordingly, a reduction of the electric potential of the cap plate and/or case to a corrosion potential or below may be prevented, thereby helping to prevent corrosion of the cap plate and/or case.

In addition, in the secondary battery according to an embodiment, the safety member may have a relatively high resistance. Thus, a relatively small amount of current may flow from the terminal portion to the cap plate and/or case in the event of nail penetration or crush of the secondary battery, thereby improving safety, performance, and efficiency of the secondary battery in the event of penetration. For example, an arc due to a high current between the terminal portion and the cap plate and/or case may be prevented, even in the event of nail penetration or crush of the secondary battery.

In addition, in the secondary battery according to an embodiment, a substantially linear terminal portion may be electrically connected to an electrode assembly and may be directly electrically connected to an external device (e.g., a bus bar). Thus, a current path length and current resistance may be reduced.

In addition, in the secondary battery according to an embodiment, a number of components of a terminal portion and a volume of the terminal portion may be reduced. Thus, a larger sized electrode assembly may be accommodated in a case of the same size. Therefore, a larger-capacity secondary battery may be obtained even with the case of the same size.

In addition, in the secondary battery according to an embodiment, in a state in which the terminal portion is coupled with the cap plate, the terminal portion and the cap plate may be integrated or held tightly together by an insulating molding resin using an insert molding method, thereby improving sealing efficiency of the secondary battery, suppressing leakage of electrolyte, and simplifying an assembling process of the secondary battery.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
   an electrode assembly;
   a case accommodating the electrode assembly;
   a cap plate coupled with the case;
   a terminal electrically connected to the electrode assembly and extending through the cap plate; and
   a safety member between the terminal and the cap plate, the safety member having:
      an apex physically contacting one of the cap plate and the terminal to electrically connect together the cap plate and the terminal, and
      sides adjacent to the apex, the sides being spaced apart from the one of the cap plate and the terminal,
   wherein an insulating molding resin is disposed between the terminal and the cap plate, and the insulating molding resin is not disposed between the apex and the one of the cap plate and the terminal.

2. The secondary battery as claimed in claim 1, wherein the terminal extends through a terminal hole in the cap plate.

3. The secondary battery as claimed in claim 2, wherein the safety member protrudes inwardly into the terminal hole in the cap plate to contact the terminal with the apex.

4. The secondary battery as claimed in claim 3, wherein the secondary battery includes a pair of safety members, the pair of safety members contacting opposing sides of the terminal.

5. The secondary battery as claimed in claim 4, wherein:
the terminal includes a pair of opposing long sides and a pair of opposing short sides, and
the pair of safety members contact the opposing long sides of the terminal.

6. The secondary battery as claimed in claim 4, wherein:
the terminal includes a pair of opposing long sides and a pair of opposing short sides, and
the pair of safety members contact the opposing short sides of the terminal.

7. The secondary battery as claimed in claim 4, wherein:
the terminal includes a pair of opposing long sides and a pair of opposing short sides,
the secondary battery includes a plurality of pairs of safety members, and
at least one pair of the plurality of pairs of safety members contact the terminal along the opposing long sides thereof.

8. The secondary battery as claimed in claim 7, wherein another pair of the plurality of pairs of safety members contact the opposing short sides of the terminal.

9. The secondary battery as claimed in claim 2, wherein the safety member protrudes from the terminal to contact an inner surfaces of the terminal hole in the cap plate.

10. The secondary battery as claimed in claim 9, wherein the secondary battery includes a pair of safety members, the pair of safety members contacting opposing surfaces of the terminal hole.

11. The secondary battery as claimed in claim 10, wherein:
the inner surfaces of terminal hole includes a pair of opposing long sides and a pair of opposing short sides, and
the pair of safety members contact the opposing long sides of the inner surfaces of the terminal hole.

12. The secondary battery as claimed in claim 10, wherein:
the inner surfaces of the terminal hole include a pair of opposing long sides and a pair of opposing short sides, and
the pair of safety members contact the opposing short sides of the inner surfaces of the terminal hole.

13. The secondary battery as claimed in claim 10, wherein:
the inner surfaces of the terminal hole include a pair of opposing long sides and a pair of opposing short sides,
the secondary battery includes a plurality of pairs of safety members, and
at least one pair of the plurality of pairs of safety members contact the inner surfaces of the terminal hole along the opposing long sides thereof.

14. The secondary battery as claimed in claim 13, wherein another pair of the plurality of pairs of safety members contact the opposing short sides of the inner surfaces of the terminal hole.

15. The secondary battery as claimed in claim 2, wherein the insulating molding resin is disposed in the terminal hole.

16. The secondary battery as claimed in claim 1, wherein the safety member is monolithically formed with the cap plate or the terminal.

17. The secondary battery as claimed in claim 1, wherein the safety member is a separately formed piece on the cap plate or the terminal.

18. The secondary battery as claimed in claim 17, wherein the safety member is formed of a same material as the cap plate or the terminal.

19. The secondary battery as claimed in claim 1, wherein the apex of the safety member is provided by one of a hemisphere, a pyramid, and a trapezoid.

20. The secondary battery as claimed in claim 1, wherein a contact area between the safety member and the one of the cap plate and the terminal is smaller than a cross sectional area of the cap plate.

* * * * *